(12) United States Patent
Brady et al.

(10) Patent No.: US 6,179,962 B1
(45) Date of Patent: Jan. 30, 2001

(54) PAPER HAVING IMPROVED STRENGTH CHARACTERISTICS AND PROCESS FOR MAKING SAME

(75) Inventors: Richard Lee Brady, Wilmington; Raymond Thomas Leibfried, Sr., Newark; Tuyen Thanh Nguyen, Wilmington, all of DE (US)

(73) Assignee: Hercules Incorporated, Wilmington, DE (US)

( * ) Notice: Under 35 U.S.C. 154(b), the term of this patent shall be extended for 0 days.

(21) Appl. No.: 09/002,281

(22) Filed: Dec. 31, 1997

(51) Int. Cl.[7] ............................. D21H 27/00; B32B 9/00
(52) U.S. Cl. .................................... 162/164.1; 162/164.3; 162/164.4; 162/164.6; 162/164.7; 162/166; 162/178; 428/409
(58) Field of Search ............................. 162/164.1, 164.3, 162/164.4, 164.6, 164.7, 166, 178; 428/409

(56) References Cited

U.S. PATENT DOCUMENTS

| | | |
|---|---|---|
| 3,049,469 | 8/1962 | Davison ............................ 162/164 |
| 3,236,823 | 2/1966 | Jennes et al. . |
| 3,297,604 | 1/1967 | Germino ............................ 260/17.4 |
| 3,467,647 | 9/1969 | Benninga et al. .................. 260/209 |
| 3,691,153 | 9/1972 | Vemuri . |
| 4,557,801 | 12/1985 | Avis . |
| 4,663,448 | 5/1987 | Chiu . |
| 4,682,654 | 7/1987 | Carter et al. . |
| 4,693,982 | 9/1987 | Carter et al. . |
| 4,703,116 | 10/1987 | Solarek et al. . |
| 4,741,804 | 5/1988 | Solarek et al. . |
| 4,794,071 | 12/1988 | Tomko et al. . |
| 4,804,769 | 2/1989 | Solarek et al. . |
| 5,262,151 | 11/1993 | Montgomery . |
| 5,270,033 | 12/1993 | Montgomery . |
| 5,318,669 | 6/1994 | Dasgupta ............................ 162/164 |
| 5,338,406 | 8/1994 | Smith . |
| 5,502,091 | 3/1996 | Dasgupta ............................ 524/55 |
| 5,554,745 | 9/1996 | Chui et al. ........................ 536/52 |
| 5,700,917 | 12/1997 | Chiu et al. . |
| 5,888,713 * | 3/1999 | Arrington et al. .................. 430/532 |

FOREIGN PATENT DOCUMENTS

| | | |
|---|---|---|
| 3830469 | 3/1990 | (DE) . |
| 232851 | 8/1987 | (EP) . |
| 2292394 | 2/1996 | (GB) . |
| 99/03351 | 1/1999 | (WO) . |
| 99/33879 | 7/1999 | (WO) . |
| 99/34009 | 7/1999 | (WO) . |

OTHER PUBLICATIONS

Willis A. Wood, "Carbohydrate Metabolism," *Methods in Enzymology*, vol. 89, pp. 163–172, 1982.

Database WPI, Section Ch, Week 9019, Derwent Publications Ltd., London, GB; Class A97, AN 90–144460, XP002099896.

Database WPI, Section Ch, Week 9502, Derwent Publications Ltd., London, GB; Class A26, AN 95–009865, XP002099897.

Document No. DEV 5484, Brady et al., filed Dec. 31, 1997.
Document No. DEV 5522, Brady et al., filed Dec. 31, 1997.

* cited by examiner

*Primary Examiner*—Christopher A. Fiorilla
(74) *Attorney, Agent, or Firm*—Greenblum & Bernstein, P.L.C.

(57) ABSTRACT

Process for making paper having improved strength characteristics by adding to the pulp water-soluble and/or water-dispersible cationic polymer and oxidized galactose type of alcohol configuration containing polymer.

70 Claims, No Drawings

PAPER HAVING IMPROVED STRENGTH CHARACTERISTICS AND PROCESS FOR MAKING SAME

BACKGROUND OF THE INVENTION

1. Field of the Invention

The present invention relates to a new process for improving paper strength and more particularly it relates to the use of combinations of oxidized galactose containing polymer and cationic polymers in the papermaking process.

2. Description of the Prior Art

The product of the oxidation of aqueous solutions of guar gum and other galactose bearing polysaccharides using galactose oxidase enzyme was disclosed by F. J. Germino in U.S. Pat. No. 3,297,604. The aldehyde bearing oxidized products are separated by precipitation from the aqueous solutions used for the enzyme reactions. Germino disclosed the use of the oxidized products in the manufacture of paper. The aldehyde bearing oxidized products were disclosed to be also suitable for use to crosslink polyamino polymers, polyhdroxy polymers, and proteins.

C. W. Chiu, et. al., U.S. Pat. No. 5,554,745, discloses (1) the preparation of cationic galactose containing polysaccharides and (2) the enzymatic oxidation in aqueous solution of the cationic galactose containing polysaccharides with galactose oxidase. The oxidized cationic polysaccharides are disclosed to improve the strength characteristics of paper.

SUMMARY OF THE INVENTION

According to the present invention, there is provided a process for making paper having improved strength characteristics by providing pulp and adding thereto (1) cationic polymer and (2) oxidized galactose type of alcohol configuration containing polymer wherein the alcohol has been oxidized to aldehyde, and sheeting and drying the paper, provided that when the oxidized galactose type of alcohol configuration containing polymer is oxidized guar it is selected from the group consisting of oxidized neutral guar, oxidized anionic guar and oxidized amphoteric guar.

Further according to the present invention there are provided paper products having improved strength characteristics prepared by using the combination of cationic polymers and oxidized galactose type of alcohol configuration containing polymers.

DETAILED DESCRIPTION OF THE INVENTION

It has surprisingly been discovered that oxidized galactose type of alcohol configuration containing polymers such as neutral, anionic and/or amphoteric oxidized guar, in combination with water-soluble or water-dispersible cationic polymers give significant strength improvement over the unoxidized or oxidized guars alone.

The treatment of oxidizable galactose type of alcohol configuration containing polymer with galactose oxidase and catalase is the subject of companion application Ser. No. 09/001,789, filed Dec. 31, 1997, entitled "Oxidation in Solid State of Oxidizable Galactose Type Alcohol Configuration Containing Polymers" by R. L. Brady, R. T. Leiffried and T. T. Nguyen, the disclosure of which is hereby incorporated by reference.

The oxidizable galactose alcohol type of configuration can be described by the following chemical structures:

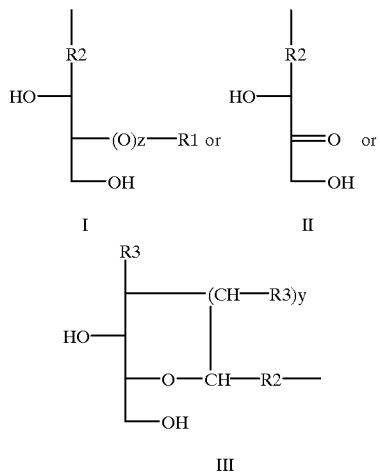

where;
R1=an alkyl group of the formula $C(n)H(2n+1)$ where n=0–20;
z=0,1;
R2=a linking group composed of an alkylene, or an aromatic alkylene, or an alkylene ether, or an alkylene ester, or an alkylene amide, or an alkylene urethane diradical. Such linking groups have a total number of carbon from 2 to 20;
R3=—H, —OH, —OCH3, —OC2H5, —OC3H7, —OC4H9, —OOCR5 (where R5=alkyl radical of 1 to 5 carbons), —NH2, —NH—CO—R5;
and y=0,1.

The oxidizable galactose type of alcohol configuration containing polymers can be galactomannan gums or their ether derivatives, arabinogalactan gums or their ether derivatives, other gums or their ether derivatives, galactoglucomannan hemicelluloses or their ether derivatives and synthetically or enzymatically modified polymers. Preferred galactomannan gums are guar, locust bean, tara and fenugreek. Preferred arabinogalactan gums are arabic, larch and tragacanth gums. Preferred synthetically or enzymatically modified polymers are galactose deficient polysaccharides, polyacrylamides, polyacrylates, polyamides, polyvinyl alcohol, and polyvinyl acetate. Most preferred such polymers are starch and polyacrylates. The phrase "galactose deficient" as used in the present application means that the oxidizable galactose type of alcohol configuration containing polymer it refers to contains less than 20% of oxidizable galactose alcohol configuration based on the weight of the oxidizable galactose type of alcohol configuration containing polymer. Preferred other gums are carubin, lichenan, tamarind and potato galactan. Most preferred oxidizable galactose type of alcohol configuration containing polymers are guar gum and its ether derivatives such as anionic, amphoteric, hydroxypropyl, dihydroxypropyl and hydroxyethyl guar.

Synthetically or enzymatically modified polymers can be obtained by transferring an oxidizable galactose alcohol type of configuration to polymers. Glycosyl transferases or hydrolases can be used to transfer galactose from lactose unto e.g., polysaccharides to provide useful polymers for oxidation. Synthetic methods can also be used to attach the oxidizable galactose alcohol type of configuration. By these methods, other oxidizable saccharides such as gulose, fructose, sorbose, mannose, talose, xylose and ribose may be attached to polymers providing candidates for oxidation.

The oxidized galactose type of alcohol configuration containing polymer component of the present invention has at least about 5 mole % of its oxidizable galactose type of alcohol configuration oxidized to aldehyde. Preferably, at least about 25 mole % and most preferably at least about 50 mole % of such alcohol has been oxidized to aldehyde. The oxidizable galactose type of alcohol configuration containing polymer used for oxidation can range over a wide molecular weight range. It can be high molecular weight, or alternatively it can be a depolymerized (reduced viscosity) polymer. Generally, the lower limit of the weight average molecular weight of the oxidizable galactose type of alcohol configuration containing polymer can be about 5,000. The upper limit of the weight average molecular weight of the oxidizable galactose type of alcohol configuration containing polymer can be about 5,000,000. Preferably, the molecular weight range as indicated by room temperature Brookfield viscosity is at least about 15 cps at 2 weight percent solution in water, most preferably, at least about 100 cps at 1 weight percent solution in water. Preferably, the room temperature Brookfield viscosity can be up to about 10,000 cps, and most preferably up to about 6,000 cps. at 1 weight percent solution in water (Measured in Brookfield LVT viscometer with small sample adapter, 25° C., spindle 31, speed 3 rpm).

Oxidized guar is preferred as the oxidized galactose type of alcohol configuration containing polymer for use in the present invention. The present application refers to oxidized guar specifically in certain instances, however, the person of ordinary skill in art will recognize that these teachings apply to the oxidized galactose type of alcohol configuration containing polymer in general.

The oxidizable galactose type of alcohol configuration containing polymer can be oxidized in solid form, in slurry form or in solution. The oxidation can be carried out chemically or enzymatically by galactose oxidase. Preferably neutral or anionic or amphoeteric guar that has been oxidized by galactose oxidase and catalase is used in the present invention. Galactose oxidase can be applied to solid, slurry, or solution forms of guar products: e.g., shredded, powder, flake, and pellet forms of neutral, anionic or amphoteric guar. Guar derivatives, such as those containing hydroxypropyl groups can also be used.

Galactose oxidase (EC 1.1.3.9) is a copper oxidase which converts the oxidizable galactose type of alcohol configuration to the corresponding aldehyde group (thus producing oxidized galactose) by reducing oxygen to hydrogen peroxide. The copper must be in the correct oxidation state ($Cu^{2+}$) to perform this oxidation and the copper ion must be retained in the galactose oxidase. If the galactose oxidase solution is stored anaerobically with any oxidizable substrate, it can become inactive. Galactose oxidase can be reactivated by oxidizing the copper with reagents such as potassium ferricyanide. Another way to oxidize the copper in galactose oxidase would be by electrochemical oxidation.

Galactose oxidase can be obtained by any suitable manner, e.g., by fermenting various wild type and cloned fungi but is usually obtained from Fusarium spp (NRRL 2903). Cultures may also be obtained from the American Type Culture Collection under Dactylium dendroides ATCC 46032 and they are successfully fermented under the procedure of Tressel and Kosman. Methods in Enzymology, Vol 89 (1982), pg 163–172. The gene for active forms of the enzyme have been expressed in *E. coli* and Aspergillus and this development may lead to more stable and active forms of the enzyme as well as much greater production levels. The gene or improved forms will also be expressed in plants which can be harvested to give higher levels of enzyme without the threat of enzyme destruction by proteases in a fermentation broth.

The enzyme can also be expressed by other organisms including: *Gibberella fujikoroi, Fusarium graminearum,* and *Bettraniella porticensis.*

The oxidation by galactose oxidase is often carried out in the presence of the catalase. The amount of catalase can be at least about 1 unit of catalase/unit of galactose oxidase. Catalase can be present in an amount of up to about 10,000 units of catalase/unit of galactose oxidase. The catalase destroys the hydrogen peroxide formed from the galactose oxidase reaction.

Increased levels of oxidation and corresponding increase in paper strength characteristics is the subject of companion application Ser. No. 09/001,785 filed Dec. 31, 1997, now U.S. Pat. No. 6,022,717, entitled "Oxidation in Solid State of Oxidizable Galactose Type Alcohol Configuration Containing Polymers" by R. L. Brady and R. T. Leiffried, the disclosure of which is hereby incorporated by reference.

Preferably the oxidation promoting chemical is organic carboxylate compound, organic heterocyclic compound, chlorinated organic compound and/or quaternary amine compound. Most preferably the organic carboxylate compound is sorbic acid, benzoic acid, toluic acid, phthalic acid and their corresponding salts, the organic heterocyclic compound is 1,2-benzisothiazoline-3-one, and/or 2-methyl-4-isothiazoline-3-one, the chlorinated organic compound is 5-chloro-2-methyl-4-isothiazolin-3-one, and quaternary amine compound is cetyltrimethylammonium bromide and/or epoxy quaternary amines.

Cationic polymers suitable for use in combination with oxidized galactose type of alcohol configuration containing polymer in the present invention are water-soluble and/or water-dispersible cationic polymers. The phrase "water-soluble" as used in the present application means a polymer of which at least about 5% by weight dissolves in water at room temperature. The phrase "water-dispersible" as used in the present application means a polymer that can be evenly distributed in water and if it settles out it can be readily redispersed. By cationic is meant anything with a net positive charge at papermaking pH's (e.g., pH of about 3 to about 10). This includes amphoteric polymers containing both anionic and cationic sites which polymers have a net cationic charge.

Preferably the cationic polymer is polymeric amine-epichlorohydrin resin, such as polyamide-epichlorohydrin (PAE) resin, polyalkylenepolyamine-epichlorohydrin (PAPAE) resin, and amine polymer-epichlorohydrin (APE) resin, in which amine polymer-epichlorohydrin resin the amine groups have been alkylated with epichlorohydrin to produce a polyamine-epichlorohydrin resin that has azetidinium or epoxide functionality; cationic derivative of polysaccharides (such as starch, guar, cellulose, and chitin; polyamine; polyethyleneimine; vinylalcohol-vinylamine copolymers; cationic acrylic homo- and copolymers such as polyacrylamide, polydiallyldimethylammonium chloride and copolymers of acrylic acid, acrylic esters and acrylamide with diallyldimethylammonium chloride, acryloyloxyethyltrimethylammonium chloride, methacryloyloxyethyltrimethylammonium methylsulfate, methacryloyloxyethyltrimethylammonium chloride and methacrylamidopropyltrimethylammonium chloride. Cationic polymers are described in more detail in U.S. Pat. Nos. 5,318,669 and 5,338,406, the disclosures of which are hereby incorporated by reference.

Most preferably the cationic polymer is cationic starch, cationic guar, polyamidoamine-epichlorohydrin resin and/or polyacrylamide. The effectiveness of the cationic polymers is particularly evident when used with oxidized anionic guar.

The total weight of oxidized galactose type of alcohol configuration containing polymer (oxidized polymer) plus cationic polymer is generally at least about 0.05%, preferably at least about 0.1% and most preferably at least about 0.15%, based on the dry weight of the paper. The total weight of oxidized polymer plus cationic polymer is generally up to about 5%, preferably up to about 1% and most preferably up to about 0.5%, based on the dry weight of the paper. The weight ratio of oxidized polymer to cationic polymer can generally be at least about 1:20, preferably at least about 1:4 and most preferably at least about 1:1. The weight ratio of oxidized polymer to cationic polymer can generally be up to about 100:1, preferably up to about 50:1 and most preferably up to about 20:1. The optimum ratio of oxidized polymer to cationic polymer would depend on the oxidized polymer used, the cationic polymer used and the type of furnish (i.e., pulp, pH, fillers, etc.) used.

The components of this invention—the cationic polymer and the oxidized galactose type of alcohol configuration containing polymer—can be added anywhere in the process of papermaking, i.e., either before or after sheet formation. For example, they can be added before sheet formation (1) early during pulp preparation in the slurry chest or refiner chest, (2) in the machine chest or stock chest, (3) at other points in the wet end such as the fan pump or in-line mixers. They can also be added to the white water chest. Examples of addition after sheet formation are in the size press or even as a later coating process. The components can be premixed or added separately in any order. Preferable practice in the wet end, however, is to add the cationic polymer first.

In addition to dry strength, properties such as Z-direction tensile strength, Scott Bond Strength, Mullen burst, ring crush, tensile energy absorption (TEA) and fracture toughness can also be improved by using the combination of cationic water-soluble and/or water-dispersible polymers and oxidized galactose type of alcohol configuration containing polymer of the present invention.

For the examples, handsheets were made on a Noble and Wood Sheet Machine (Noble and Wood Machine Co., Hoosick Falls, N.Y.) using standard hard water at a controlled pH of 7.5. Standard hard water (50 ppm alkalinity and 100 ppm hardness) was made by mixing deionized water with $CaCl_2$ and $NaHCO_3$. Control of pH was achieved by using NaOH or $H_2SO_4$. Bleached kraft pulp was beaten to a Canadian Standard Freeness of 455 at a consistency of 2.5 weight %. The beaten pulp was added to the proportioner at a controlled level (depending on final desired basis weight) and diluted to 18 liters with standard hard water. For 80 lb/3000 $ft^2$ basis weight, 4000 ml of pulp mixture was used. Chemical additions and pH adjustments were made to the proportioner as desired, and with continuous mixing. For the examples with multiple additives, the cationic additive was always added first.

A clean and wetted 100 mesh screen was placed on the open deckle box, which was then closed. Standard hard water and 920 ml of pulp mixture from the proportioner were then added to the deckle box, and dashed. The water was then drained from the box, and the sheet removed. The sheet was wet pressed between felts with press weights adjusted to give a solids content of 33–34%. The sheet and screen were then placed on a drum dryer, which was adjusted to a temperature of 228–232° F. and throughput time of 50–100 sec, depending on basis weight. Final sheet moisture contents were 3–5%. Five sheets minimum were tested for each experimental set.

Tensile testing was done on the handsheets according to TAPPI Method T 494 om-88 ("TAPPI Test Methods", TAPPI Press, Atlanta, Ga., 1996).

The scope of this invention as claimed is not intended to be limited by the following examples, which are given merely by way of illustration. All parts are by weight unless otherwise indicated.

EXAMPLE 1

This example demonstrates the effectiveness of Kymene® 557H polyamidoamine-epichlorohydrin wet strength resin (cationic polymer) available from Hercules Incorporated, used with oxidized neutral and oxidized anionic guars. To make oxidized neutral guar, 2.268 g of Supercol U neutral guar powder (89.52% solids available from Hercules Incorporated), was added to 1197 g of sterile distilled water with constant stirring. 0.034 g of catalase (Sigma C40 available from Sigma Chemical Company, 3735 units/unit of G7400) and 0.0158 g of galactose oxidase (Sigma G7400 available from Sigma Chemical Company, 57 units/g guar) were then added with stirring overnight. The final solution concentration was 0.2% oxidized guar.

Anionic oxidized guar was also made in solution as above using 2.643 g of Galactasol 70M22FD carboxymethyl guar powder (90.8% solids, available from Hercules Incorporated), 1195 g of sterile distilled water, 1.1 g of 3% HCl (for pH adjustment to 6), 0.605 g of C40 catalase (3889 units/unit G7400), and 0.2700 g of G7400 galactose oxidase (972 units/g guar). Cationic oxidized guar was made in solution by mixing 6.6313 g of Galactasol SP813D cationic guar powder (91.86% solids, available from Hercules Incorporated), 2700 g of distilled water, 1.026 g of 10% HCl, 1.5379 g of C40 catalase (3889 units/unit G7400), and 0.6863 g of G7400 galactose oxidase (972 units/g guar).

Handsheets at 80 lb/3000 $ft^2$ basis were made with bleached kraft pulp using a total additive level (Kymene® resin+guar) of 1% based on dry weight of pulp. Table I shows the results for dry tensile strength. Use of Kymene® 557H greatly increases the dry strength for both neutral and anionic oxidized guars, and they can be as high as that achieved by cationic oxidized guar.

TABLE I

Dry tensile strength of oxidized guars with Kymene ® 557H resin

| Additive | Guar Level, % | Kymene ® Resin Level, % | Dry Tensile, lb/in |
|---|---|---|---|
| None | 0 | 0 | 40.05 |
| Neutral Ox. Guar (NOG) | 1 | 0 | 48.18 |
| NOG/Kymene | 0.8 | 0.2 | 54.58 |
| NOG/Kymene | 0.5 | 0.5 | 57.73 |
| Anionic Ox. Guar (AOG) | 1 | 0 | 43.36 |
| AOG/Kymene | 0.8 | 0.2 | 56.77 |
| AOG/Kymene | 0.5 | 0.5 | 62.84 |
| Kymene 557H | 0 | 1 | 53.34 |
| Cationic Ox. Guar | 1 | 0 | 61.92 |

EXAMPLE 2

This example shows the effectiveness of unoxidized cationic guar with anionic oxidized guar (AOG). AOG was made in solution as in Example 1 by mixing 1900 g of distilled water, 4.185 g of Galactasol 70M22FD guar powder, 1.7 g of 3% HCl, 0.038 g of sodium benzoate, 0.1902 g of C40 catalase (1852 units/unit G7400), and 0.2376 g of G7400 galactase oxidase (540 units/g guar). The mixture was stirred vigorously overnight. The cationic guar (SP813D, unoxidized) was used as a 0.2% solution.

Handsheets at 80 lb/3000 ft² basis were made with bleached kraft pulp using a total additive level of 1% based on pulp. Table II shows the results for dry and wet tensile strength. Adding cationic guar increases dry and wet tensile strength of anionic oxidized guar.

TABLE II

Dry and wet tensile for AOG with cationic guar.

| Additive | Level of AOG, % | Level of Cat. Guar, % | Dry Tensile, lb/in | Wet Tensile (2 hr soak), lb/in |
|---|---|---|---|---|
| None | 0 | 0 | 39.97 | 1.26 |
| AOG | 1 | 0 | 43.55 | 1.83 |
| AOG/cat guar | 0.5 | 0.5 | 51.51 | 3.33 |
| Cat. Guar | 0 | 1 | 43.35 | 1.12 |

EXAMPLE 3

This example shows the effectiveness of using cationic starch with neutral oxidized guar. Neutral oxidized guar was made in solution by mixing 1297.4 g of distilled water, 2.917 g of neutral flaked guar, (2.6 g dry), 0.4679 g of C40 catalase (3704 units/unit G7400), and 0.2924 g of G7400 galactose oxidase (972 units/g guar). The solution was mixed well for 2 days before use. Cationic starch (Stalok 430, available from A.E. Staley Manufacturing Co.) was used to make a 1% solution, and the solution was cooked at 90–100° C. for 45 minutes before use in handsheets.

Handsheets at 80 lb/3000 ft² basis were made with bleached kraft pulp using a total additive level of 1% based on pulp. Table III shows the results for dry tensile strength. Cationic starch combined with neutral oxidized guar (NOG) provides a high level of paper strength.

TABLE III

Dry tensile for cationic starch with neutral guars

| Additive | Level of Guar, % | Level of Cat. Starch, % | Dry Tensile, lb/in |
|---|---|---|---|
| None | 0 | 0 | 38.39 |
| Cat. Starch | 0 | 1 | 49.08 |
| Neutral Guar (NG) | 1 | 0 | 45.88 |
| NG/Cat. Starch | 0.5 | 0.5 | 47.42 |
| NOG/Cat. Starch | 0.5 | 0.5 | 55.60 |
| NOG/Cat. Starch | 0.9 | 0.1 | 57.19 |

EXAMPLE 4

This example illustrates the use of polyethyleneimine (Polymin P, available from BASF Corporation) or polydiallyldimethylammonium chloride (Reten® 203, Hercules Incorporated) with anionic oxidized guar. Anionic oxidized guar is made as in Example 1. Handsheets at 80 lb/3000 ft² are made with bleached kraft pulp, using 0.8% anionic oxidized guar and 0.2% of Reten® 203 or Polymin P based on the dry weight of pulp. The cationic polymer is added to the proportioner first. Use of the Polymin P or Reten® 203 polymers will result in paper with increased tensile strength over that made with 1% anionic oxidized guar only.

EXAMPLE 5

This example illustrates the use of oxidized locust bean gum with Kymene® 557H polyamidoamine-epichlorohydrin resin. Locust bean gum is oxidized according to the procedure to Supercol U in Example 1. Handsheets at 80 lb/300 ft² are made with bleached kraft pulp, using 0.8% of oxidized locust bean gum and 0.2% of Kymene® 557H resin based on the dry weight of pulp. The Kymene® resin is added to the proportioner first. Use of the Kymene® resin will result in paper with increased tensile strength over that made with 1% oxidized locust bean gum only.

What is claimed is:

1. Process for making paper having improved strength characteristics comprising providing pulp and adding thereto (1) cationic polymer and (2) oxidized galactose type of alcohol configuration containing polymer wherein alcohol has been oxidized to aldehyde, and sheeting and drying paper, provided that when the oxidized galactose type of alcohol configuration containing polymer is guar it is selected from the group consisting of oxidized neutral guar, oxidized anionic guar and oxidized amphoteric guar, wherein the oxidizable galactose alcohol type of configuration is described by the following chemical structures

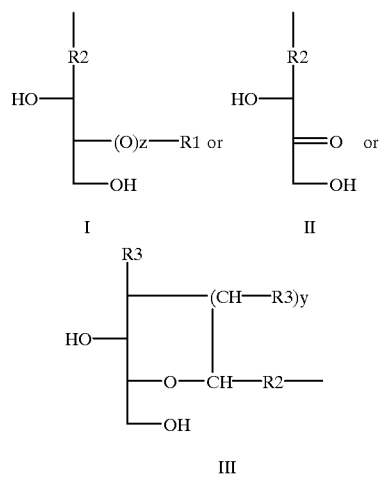

where, R1 is an alkyl group of the formula $C_{(n)}H_{(2n+1)}$ where n is 0 to 20; z is 0 or 1; where R2 is a linking group composed of an alkylene, or an aromatic alkylene, or an alkylene ether, or an alkylene ester, or an alkylene amide, or an alkylene urethane diradical where said linking group has a total number of carbon of from 2 to 20; where R3 is —H, —OH, —OCH$_3$, —OC$_2$H$_5$, —OC$_3$H$_7$, —OC$_4$H$_9$, —OOCR5 (where R5 is alkyl radical of 1 to 5 carbons), —NH$_2$, —NH—CO—R5; and y is 0 or 1; and wherein the oxidizable galactose type of alcohol configuration containing polymer is selected from the group consisting of oxidized galactomannan gums or their ether derivatives, oxidized arabinogalactan gums or their ether derivatives, other oxidized gums or their ether derivatives, oxidized galactoglucomannan hemicelluloses or their ether derivatives and oxidized synthetically or enzymatically modified polymers.

2. The process of claim 1 wherein the cationic polymer is water soluble.

3. The process of claim 1 wherein the cationic polymer is water dispersible.

4. The process of claim 1 wherein in the oxidized galactose type of alcohol configuration containing polymer at least about 5 mole % of the oxidizable galactose type of alcohol has been oxidized to aldehyde.

5. The process of claim 4 wherein the weight average molecular weight of the oxidized galactose type of alcohol configuration containing polymer is from about 5,000 to about 5,000,000, the cationic polymer is water soluble or water dispersible, the total amount of cationic polymer and oxidized galactose type of alcohol configuration containing polymer added to the pulp is from about 0.05 to about 5% based on the dry weight of the pulp, the ratio by weight of the oxidized galactose type of alcohol configuration containing polymer is from about 1:20 to about 100:1, the cationic polymer is selected from the group consisting of polymeric amine-epichlorohydrin resins, polysaccharides, polyamines, polyethyleneimine, vinylalcohol-vinylamine copolymers and acrylic homo- and copolymers, and the oxidized galactose type of alcohol configuration containing polymer has been obtained by oxidation with galactose oxidase.

6. The process of claim 5 wherein in the oxidized galactose type of alcohol configuration containing polymer at least about 25 mole % of the oxidizable galactose type of alcohol configuration has been oxidized to aldehyde.

7. The process of claim 6, wherein the total amount of cationic polymer and oxidized galactose type of alcohol configuration containing polymer is from about 0.1 to about 1%, based on the dry weight of the pulp, the ratio of oxidized galactose type of alcohol configuration containing polymer to cationic polymer is from about 1:4 to about 50:1, the polymeric amine-epichlorohydrin resin is selected from the group consisting of polyamide-epichlorohydrin (PAE) resin, polyalkylenepolyamine-epichlorohydrin (PAPAE) resin, and amine polymer-epichlorohydrin (APE) resin, in which polymeric amine-epichlorohydrin resin the amine groups have been alkylated with epichlorohydrin to produce a polyamine-epichlorohydrin resin that has azetidinium or epoxide functionality; the polysaccharides are selected from the group consisting of starch, guar, cellulose, and chitin; the cationic acrylic homo- and copolymers are selected from the group consisting of polydiallyldimethylammonium chloride and copolymers of acrylic acid, acrylic esters and acrylamide with diallyldimethylammonium chloride, acryloyloxyethyltrimethylammonium chloride, methacryloyloxyethyltrimethylammonium methylsulfate, methacryloyloxyethyltrimethylammonium chloride and methacrylamidopropyltrimethylammonium chloride; the oxidized galactomannan gum is selected from the group consisting of oxidized guar, oxidized locust bean, oxidized tara and oxidized fenugreek gum or their ether derivatives; the oxidized arabinogalactan gum is selected from the group consisting of oxidized larch, oxidized arabic and oxidized tragacanth gum or their ether derivatives, the other oxidized gum is selected from the group consisting of oxidized carubin, oxidized lichenan and oxidized potato galactan gum or their ether derivatives the oxidized synthetically or enzymatically modified polymer is selected from the group consisting of galactose deficient polysaccharides, polyacrylates, polyacrylamides, polyvinyl alcohol and polyvinyl acetate and the viscosity of the oxidizable galactose type of alcohol configuration containing polymer is from about 15 cps at 2 weight % solution in water to about 10,000 cps at 1 weight % solution in water.

8. The process of claim 7 wherein in the oxidized galactose type of alcohol configuration containing polymer at least about 50 mole % of the oxidizable galactose type of alcohol configuration has been oxidized to aldehyde.

9. The process of claim 8 wherein the oxidized galactose type of alcohol configuration containing polymer comprises oxidized guar, the total amount of cationic polymer and oxidized guar is from about 0.15 to about 0.5%, based on the dry weight of the pulp, the ratio of oxidized guar to cationic polymer is from about 1:1 to about 20:1, the cationic polymer is selected from the group consisting of starch, guar, polyamidoamine-epichlorohydrin resins and acrylic copolymers and the viscosity of the guar to be oxidized is from about 100 cps at 1 weight % solution in water to about 6,000 cps at 1 weight % solution in water.

10. The process of claim 7 wherein the total amount of cationic polymer and oxidized galactose type of alcohol configuration containing polymer is at least about 0.15%, based on the dry weight of the pulp.

11. The process of claim 7 wherein the total amount of cationic polymer and oxidized galactose type of alcohol configuration containing polymer is up to about 0.5%, based on the dry weight of the pulp.

12. The process of claim 7 wherein the ratio of oxidized galactose type of alcohol configuration containing polymer to cationic polymer is at least about 1:1.

13. The process of claim 7 wherein the ratio of oxidized galactose type of alcohol configuration containing polymer to cationic polymer is up to about 20:1.

14. The process of claim 7 wherein the cationic polymer is selected from the group consisting of starch, guar, polyamidoamine-epichlorohydrin resins and acrylic copolymers.

15. The process of claim 7 wherein the oxidized galactose type of alcohol configuration containing polymer comprises oxidized guar.

16. The process of claim 15 wherein the viscosity of the guar to be oxidized is at least about 100 cps at 1 weight % solution in water.

17. The process of claim 15 wherein the viscosity of the guar to be oxidized is up to about 6,000 cps at 1 weight % solution in water.

18. The process of claim 7 wherein the cationic polymer and oxidized galactose type of alcohol configuration containing polymer is added to the pulp before sheeting.

19. The process of claim 7 wherein the cationic polymer and oxidized galactose type of alcohol configuration containing polymer is added to the pulp after sheeting.

20. The process of claim 5 wherein the total amount of cationic polymer and oxidized galactose type of alcohol configuration containing polymer is at least about 0.1%, based on the dry weight of the pulp.

21. The process of claim 5 wherein the total amount of cationic polymer and oxidized galactose type of alcohol configuration containing polymer is up to about 1%, based on the dry weight of the pulp.

22. The process of claim 5 wherein the ratio by weight of oxidized galactose type of alcohol configuration containing polymer to cationic polymer is at least about 1:4.

23. The process of claim 5 wherein the ratio by weight of oxidized galactose type of alcohol configuration containing polymer to cationic polymer is up to about 50:1.

24. The process of claim 5 wherein the polymeric amine-epichlorohydrin resin is selected from the group consisting of polyamide-epichlorohydrin (PAE) resin, polyalkylenepolyamine-epichlorohydrin (PAPAE) resin, and amine polymer-epichlorohydrin (APE) resin, in which polymeric amine-epichlorohydrin resin the amine groups have been alkylated with epichlorohydrin to produce polyamine-epichlorohydrin resin that has azetidinium or epoxide functionality; the polysaccharides are selected from the group consisting of starch, guar, cellulose, and chitin and the cationic acrylic homo- and copolymers are selected from the group consisting of polydiallyldimethylammonium chloride and copolymers of acrylic acid, acrylic esters and acrylamide with diallyldimethylammonium chloride, acryloyloxyethyltrimethylammonium chloride, methacryloyloxyethyltrimethylammonium methylsulfate, methacryloyloxyethyltrimethylammonium chloride and methacrylamidopropyltrimethylammonium chloride.

25. The process of claim 5 wherein the oxidized galactomannan gum is selected from the group consisting of oxidized guar, oxidized locust bean, oxidized tara and oxidized fenugreek gum or their ether derivatives; the oxidized arabinogalactan gum is selected from the group consisting of oxidized larch oxidized arabic and oxidized tragacanth gum or their ether derivatives, the other oxidized gum is selected from the group consisting of oxidized carubin, oxidized lichenan and oxidized potato galactan gum or their ether derivatives and the oxidized synthetically or enzymatically modified polymer is selected from the group consisting of galactose deficient polysaccharides, polyacrylates, polyacrylamides, polyvinyl alcohol and polyvinyl acetate.

26. The process of claim 5 wherein the cationic polymer and oxidized galactose type of alcohol configuration containing polymer is added to the pulp before sheeting.

27. The process of claim 5 wherein the cationic polymer and oxidized galactose type of alcohol configuration containing polymer is added to the pulp after sheeting.

28. The process of claim 5 wherein the viscosity of the oxidizable galactose type of alcohol configuration containing polymer is at least about 15 cps at 2 weight % solution in water.

29. The process of claim 5 wherein the viscosity of the oxidizable galactose type of alcohol configuration containing polymer is up to about 8000 cps at 1 weight % solution in water.

30. The process of claim 1 wherein the weight average molecular weight of the oxidized galactose type of alcohol configuration containing polymer is at least about 5,000.

31. The process of claim 1 wherein the weight average molecular weight of the oxidized galactose type of alcohol configuration containing polymer is up to about 5,000,000.

32. The process of claim 1 wherein the total amount of the cationic polymer and oxidized galactose type of alcohol configuration containing polymer added to the pulp is at least about 0.05% based on the dry weight of the pulp.

33. The process of claim 1 wherein the total amount of the cationic polymer and oxidized galactose type of alcohol configuration containing polymer added to the pulp is up to about 5% based on the dry weight of the pulp.

34. The process of claim 1 wherein the ratio by weight of the oxidized galactose type of alcohol configuration containing polymer to cationic polymer is at least about 1 to 20.

35. The process of claim 1 wherein the ratio by weight of the oxidized galactose type of alcohol configuration containing polymer to cationic polymer cationic polymer is up to about 100 to 1.

36. The process of claim 1 wherein the cationic polymer is selected from the group consisting of polymeric amine-epichlorohydrin resins, polysaccharides, polyamines, polyethyleneimine, vinylalcohol-vinylamine copolymers and acrylic homo- and copolymers.

37. The process of claim 1 wherein the oxidized galactose type of alcohol configuration containing polymer has been obtained by oxidation with galactose oxidase.

38. The process of claim 1 wherein the cationic polymer and oxidized galactose type of alcohol configuration containing polymer is added to the pulp before sheeting.

39. The process of claim 1 wherein the cationic polymer and oxidized galactose type of alcohol configuration containing polymer is added to the pulp after sheeting.

40. The process of claim 1 wherein the oxidized synthetically or enzymatically modified polymer is selected from the group consisting of galactose deficient polysaccharides, polyacrylates, polyacrylamides, polyvinyl alcohol and polyvinyl acetate.

41. Paper having improved dry strength comprising (1) cationic polymer and (2) oxidized galactose type of alcohol configuration containing polymer wherein the galactose type of alcohol has been oxidized to aldehyde, provided that when the oxidized galactose type of alcohol configuration containing polymer is guar it is selected from the group consisting of oxidized neutral guar, oxidized anionic guar and oxidized amphoteric guar, wherein the oxidizable galactose alcohol type of configuration is described by the following chemical structures

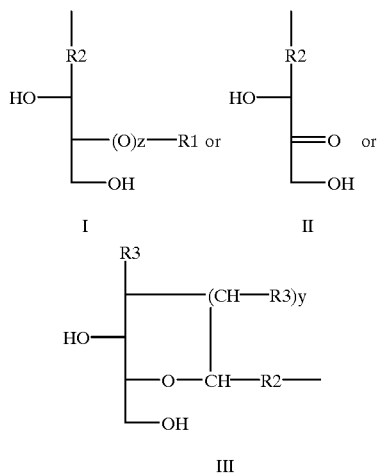

where, R1 is an alkyl group of the formula $C(n)H(2n+1)$ where n is 0 to 20; z is 0 or 1; where R2 is a linking group composed of an alkylene, or an aromatic alkylene, or an alkylene ether, or an alkylene ester, or an alkylene amide, or an alkylene urethane diradical where said linking group has a total number of carbon of from 2 to 20; where R3 is —H, —OH, —OCH$_3$, —OC$_2$H$_5$, —OC$_3$H$_7$, —OC$_4$H$_9$, —OOCR5 (where R5 is alkyl radical of 1 to 5 carbons), —NH$_2$, —NH—CO—R5; and y is 0 or 1; and wherein the oxidizable galactose type of alcohol configuration containing polymer is selected from the group consisting of oxidized galactomannan gums or their ether derivatives, oxidized arabinogalactan gums or their ether derivatives, other oxidized gums or their ether derivatives, oxidized galactoglucomannan hemicelluloses or their ether derivatives and oxidized synthetically or enzymatically modified polymers.

42. The paper of claim 41 wherein the cationic polymer is selected from the group consisting of polymeric amine-epichlorohydrin resins, polysaccharides, polyamines, polyethyleneimine, vinylacohol-vinylamine copolymers and acrylic homo- and copolymers.

43. The paper of claim 41 wherein in the oxidized galactose type of alcohol configuration containing polymer at least about 5 mole % of the oxidizable galactose type of alcohol has been oxidized to aldehyde.

44. The paper of claim 43 wherein the weight average molecular weight of the oxidized galactose type of alcohol configuration containing polymer is from about 5,000 to about 5,000,000, the cationic polymer is water soluble or water dispersible, the total amount of cationic polymer and oxidized galactose type of alcohol configuration containing polymer is from about 0.05 to about 5% based on the dry weight of the paper, the weight ratio of the oxidized galactose type of alcohol configuration containing polymer is from about 1:20 to about 100:1, the cationic polymer is selected from the group consisting of polymeric amine-epichlorohdrin resins, polysaccharides, polyamines, polyethyleneimine, vinylalcohol-vinylamine copolymers and acrylic homo- and copolymers; and the viscosity of the oxidizable galactose type of alcohol configuration containing polymer is from about 15 cps at 2 weight % solution in water to about 10,000 cps at 1 weight % solution in water.

45. The paper of claim 44 wherein the polymeric amine-epichlorohydrin resin is selected from the group consisting of polyamide-epichlorohydrin (PAE) resin, polyalkylenepolyamine-epichlorohydrin (PAPAE) resin, and amine polymer-epichlorohydrin (APE) resin, in which polymeric amine-epichlorohydrin resin the amine groups have been alkylated with epichlorohydrin to produce a polyamine-epichlorohydrin resin that has azetidinium or epoxide functionality; the polysaccharides are selected from the group consisting of starch, guar, cellulose and chitin and the cationic acrylic homo- and copolymers are selected from the group consisting of polydiallyldimethylammonium chloride and copolymers of acrylic acid, acrylic esters and acrylamide with diallyldimethylammonium chloride, acryloyloxyethyltrimethylammonium chloride, methacryloyloxyethyltrimethylammonium methylsulfate, methacryloyloxyethyltrimethylammonium chloride and methacrylamidopropyltrimethylammonium chloride.

46. The paper of claim 44 wherein the oxidized galactomannan gum is selected from the group consisting of oxidized guar, oxidized locust bean, oxidized tara and oxidized fenugreek gum or their ether derivatives, the oxidized arabinogalactan gum is selected from the group consisting of oxidized larch and oxidized tragacanth gum or their ether derivatives and the other oxidized gum is selected from the group consisting of oxidized carubin, oxidized lichenan and oxidized potato galactan gum or their ether derivatives.

47. The paper of claim 44 wherein in the oxidized galactose type of alcohol configuration containing polymer at least about 25% of the oxidizable galactose type of alcohol has been oxidized to aldehyde.

48. The paper of claim 47 wherein the total amount of cationic polymer and oxidized galactose type of alcohol configuration containing polymer is from about 0.1 to about 1%, based on the dry weight of the paper, the ratio of oxidized galactose type of alcohol configuration containing polymer containing polymer to cationic polymer is from about 1:4 to about 50:1, the polymeric amine-epichlorohydrin resin is selected from the group consisting of polyamide-epichlorohydrin (PAE) resin, polyalkylenepolyamine-epichlorohydrin (PAPAE) resin, and amine polymer-epichlorohydrin (APE) resin, in which polymeric amine-epichlorohydrin resin the amine groups have been alkylated with epichlorohydrin to produce a polyamine-epichlorohydrin resin that has azetidinium or epoxide functionality; the polysaccharides are selected from the group consisting of starch, guar, cellulose and chitin; the cationic acrylic homo- and copolymers are selected from the group consisting of polydiallyldimethylammonium chloride and copolymers of acrylic acid, acrylic esters and acrylamide with diallyldimethylammonium chloride, acryloyloxyethyltrimethylammonium chloride, methacryloyloxyethyltrimethylammonium methylsulfate, methacryloyloxyethyltrimethylammonium chloride and methacrylamidopropyltrimethylammonium chloride; the oxidized galactomannan gum is selected from the group consisting of oxidized guar, oxidized locust bean, oxidized tara and oxidized fenugreek gum or their ether derivatives; the oxidized arabinogalactan gum is selected from the group consisting of oxidized larch, oxidized arabic and oxidized tragacanth gum or their ether derivatives, the other oxidized gum is selected from the group consisting of oxidized carubin, oxidized lichenan and oxidized potato galactan gum or their ether derivatives and the oxidized synthetically or enzymatically modified polymer is selected from the group consisting of galactose deficient polysaccharides, polyacrylates, polyacrylamides, polyvinyl alcohol and polyvinyl acetate and the viscosity of the oxidizable galactose type of alcohol configuration containing polymer is from about 100 cps at 1 weight % solution in water to about 6,000 cps at 1 weight % solution in water.

49. The paper of claim 48 wherein the oxidized galactose type of alcohol configuration containing polymer containing polymer comprises oxidized guar and the cationic polymer is selected from the group consisting of starch, guar, polyamidoamine-epichlorohydrin resins and acrylic copolymers.

50. The paper of claim 49 wherein in the oxidized guar at least about 50 mole % of the galactose type of alcohol has been oxidized to aldehyde.

51. The paper of claim 49 wherein the total amount of cationic polymer and oxidized guar is at least about 0.15%, based on the dry weight of the paper.

52. The paper of claim 49 wherein the total amount of cationic polymer and oxidized guar is up to about 0.5%, based on the dry weight of the paper.

53. The paper of claim 49 wherein the ratio of oxidized guar to cationic polymer is at least about 1:1.

54. The paper of claim 49 wherein the ratio of oxidized guar to cationic polymer is up to about 20:1.

55. The paper of claim 44 wherein the oxidized galactose type of alcohol configuration containing polymer has been obtained by oxidation with galactose oxidase.

56. The paper of claim 44 wherein the total amount of cationic polymer and oxidized galactose type of alcohol configuration containing polymer is at least about 0.1%, based on the dry weight of the paper.

57. The paper of claim 44 wherein the total amount of cationic polymer and oxidized galactose type of alcohol configuration containing polymer is up to about 1%, based on the dry weight of the paper.

58. The paper of claim 44 wherein the ratio of oxidized galactose type of alcohol configuration containing polymer to cationic polymer is at least about 1:4.

59. The paper of claim 44 wherein the ratio of oxidized galactose type of alcohol configuration containing polymer to cationic polymer is up to about 50:1.

60. The paper of claim 44 wherein the viscosity of the oxidizable galactose type of alcohol configuration containing polymer is at least about 100 cps at 1 weight % solution in water.

61. The paper of claim 44 wherein the viscosity of the oxidizable galactose type of alcohol configuration containing polymer is up to about 6,000 cps at 1 weight % solution in water.

62. The paper of claim 41 wherein the weight average molecular weight of the oxidized galactose type of alcohol configuration containing polymer is at least about 5,000.

63. The paper of claim 41 wherein the weight average molecular weight of the oxidized galactose type of alcohol configuration containing polymer is up to about 5,000,000.

64. The paper of claim 41 wherein the total amount of the cationic polymer and oxidized galactose type of alcohol configuration containing polymer is at least about 0.05% based on the dry weight of the paper.

65. The paper of claim 41 wherein the total amount of the cationic polymer and oxidized galactose type of alcohol configuration containing polymer is up to about 5% based on the dry weight of the paper.

66. The paper of claim 41 wherein the ratio by weight of the oxidized galactose type of alcohol configuration containing polymer to cationic polymer is at least about 1 to 20.

67. The paper of claim 41 wherein the ratio by weight of the oxidized galactose type of alcohol configuration containing polymer to cationic polymer is up to about 100 to 1.

68. The paper of claim 41 wherein the oxidized synthetically or enzymatically modified polymer is selected from the group consisting of galactose deficient polysaccharides, polyacrylates, polyacrylamides, polyvinyl alcohol and polyvinyl acetate.

69. The paper of claim 41 wherein the viscosity of the oxidizable galactose type of alcohol configuration containing polymer is at least about 15 cps at 2 weight % solution in water.

70. The paper of claim 41 wherein the viscosity of the oxidizable galactose type of alcohol configuration containing polymer is up to about 8000 cps at 1 weight % solution in water.

* * * * *